B. B. GORDON.
WEIGHING SCALE.
APPLICATION FILED MAY 14, 1919.
1,331,757.
Patented Feb. 24, 1920.
3 SHEETS—SHEET 1.
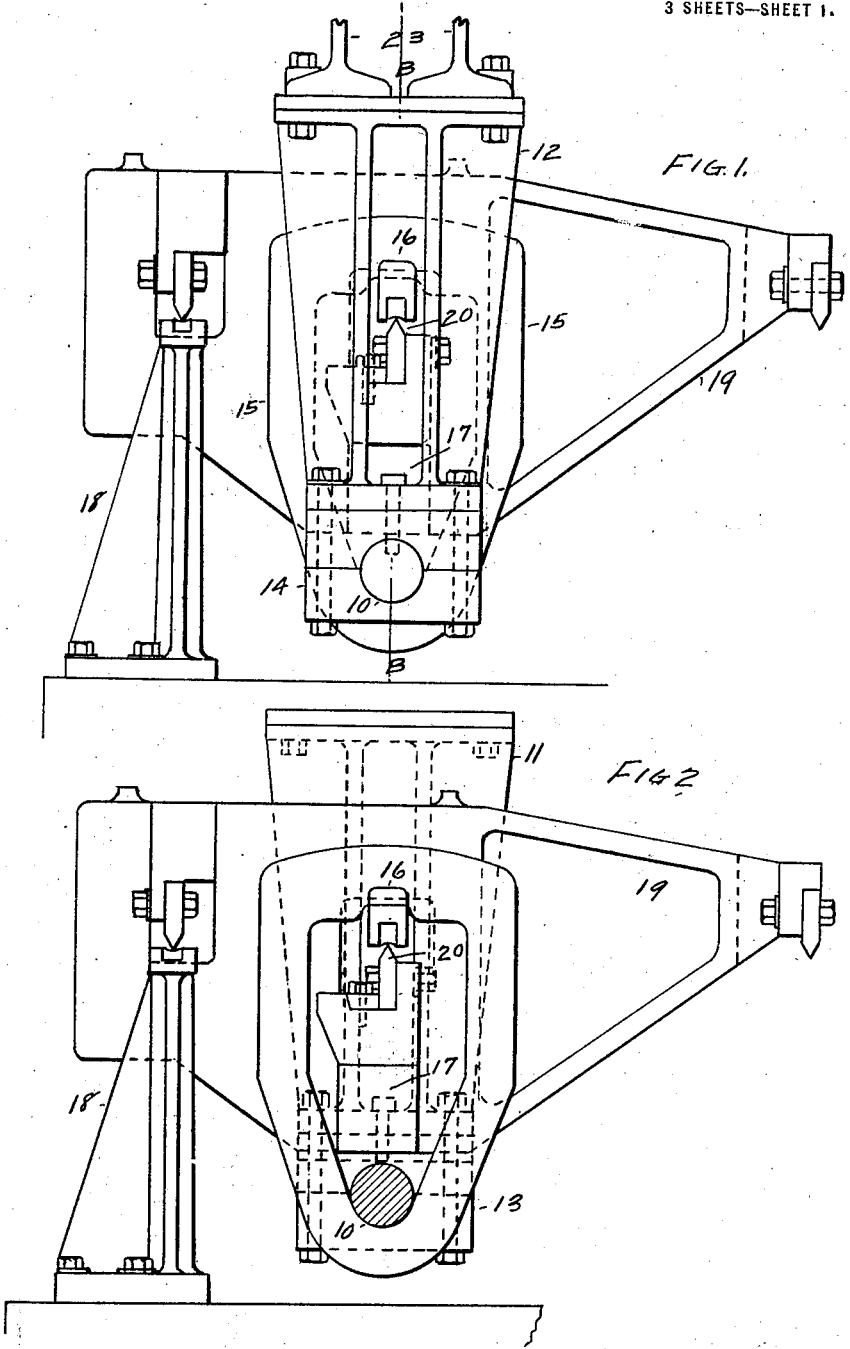
WITNESSES:
William J. Chapman
G. C. Bailey
INVENTOR.
Byron B Gordon
BY
E. H. Bond
ATTORNEY

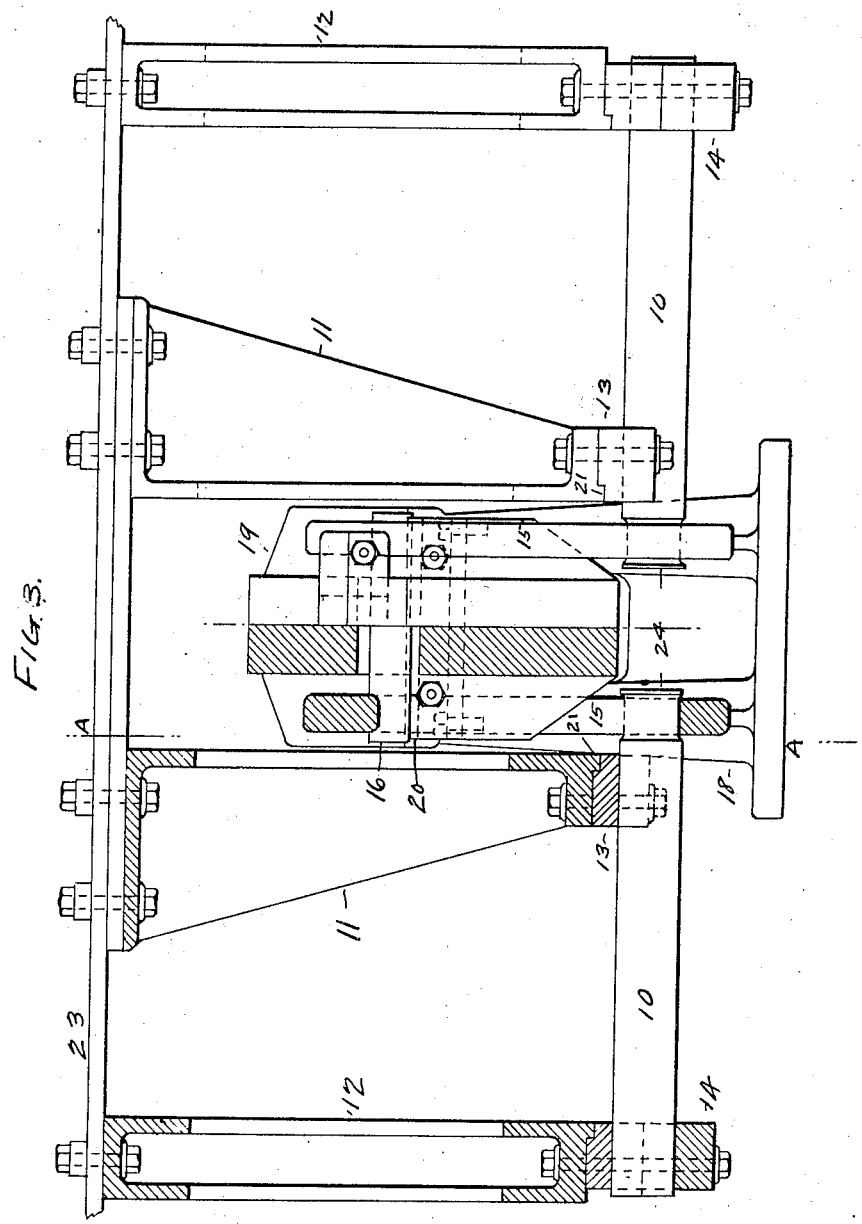

B. B. GORDON.
WEIGHING SCALE.
APPLICATION FILED MAY 14, 1919.
1,331,757.
Patented Feb. 24, 1920.
3 SHEETS—SHEET 3.
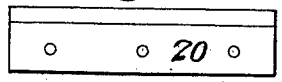
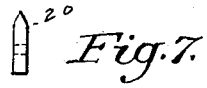
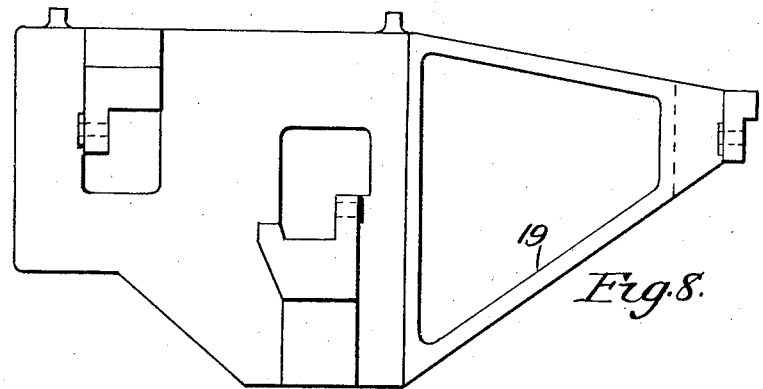
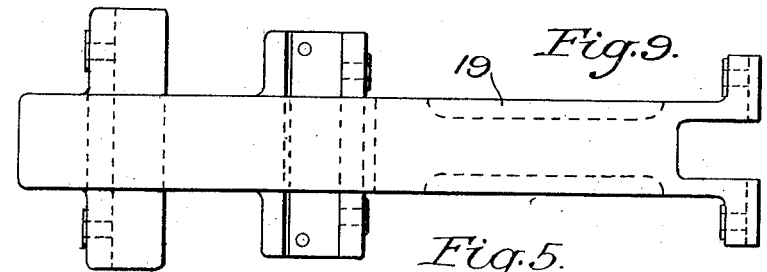
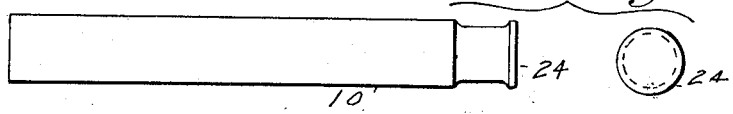
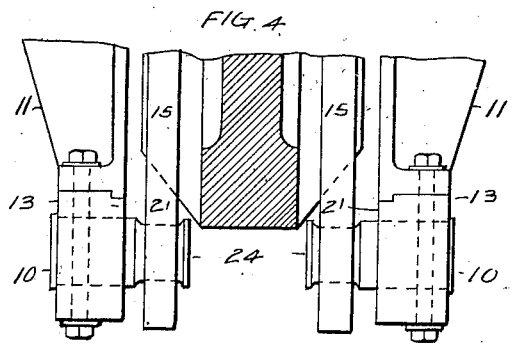
WITNESSES:
William S. Chapman
George C. Bailey
INVENTOR.
Byron B. Gordon
BY E. H. Bond
ATTORNEY.

UNITED STATES PATENT OFFICE.

BYRON B. GORDON, OF LOGANSPORT, INDIANA.

WEIGHING-SCALE.

1,331,757.   Specification of Letters Patent.   Patented Feb. 24, 1920.

Application filed May 14, 1919. Serial No. 296,966.

*To all whom it may concern:*

Be it known that I, BYRON B. GORDON, a citizen of the United States, residing at Logansport, in the county of Cass and State of Indiana, have invented a new and useful Improvement in Weighing-Scales, of which the following is a specification.

My invention relates especially to track scales. The object of my invention is to provide a type of bearings which are more adaptable to machine work.

Another object is to provide a bearing in which the deflection can be reduced to a minimum.

Another object of the invention is to provide a bearing which will be easy to assemble and disconnect when repairs are to be made.

Another object of the invention is to provide a bearing which by its design makes the scale accessible for inspection, etc.

I attain these objects by the mechanism illustrated in the accompanying drawings, in which—

Figure 1 is a side elevation of the bearing.

Fig. 2 is a side elevation of bearings taken on line A—A, Fig. 3.

Fig. 3 is a longitudinal elevation view of the bearing.

Fig. 4 is a modification view of the bearings and shaft.

Fig. 5 is a detail view of the shaft or journal in side and end views.

Fig. 6 is an edge view of the knife edge removed.

Fig. 7 is an end view thereof.

Fig. 8 is a view of the main lever.

Fig. 9 is a top plan thereof.

Similar letters refer to similar parts throughout the several views.

In the ordinary track scale there are four or more sections and each section contains two main levers with bearings complete, main lever stands, links, etc. In describing one main lever, bearings and component parts, we describe all of them.

There are a number of means to suspend or impose the weigh bridge platform to the above main lever, but the one shown on the drawings, we believe excels all other types for rigidity and ease of fitting and disconnecting the scale from the weigh bridge.

The new features of the bearing or parts which go to form a part of the bearing in my invention are the shafts or journals 10 and brackets 11 and 12.

The complete bearing is composed of the following parts, journal or shafts, 10, brackets 11 and 12, journal boxes 13 and 14, link 15, bearing or saddle block 16, pin 17. These parts in connection with the main lever stand 18 and main lever 19 and its knife edges 20, complete the weighing mechanism for that particular part of the scale.

The advantage that shafts or journals 10 of this type have is that they will give more rigidity to that part of the bearing. There is also a better opportunity to fit up the journals and journal boxes on precision mechanism. Another advantage is the length of the shafts 10. This is where the rigidity exists as the downward pressure at 21 is more readily resisted when the shaft is of suitable length.

The brackets 11, journal box 13, act as a fulcrum heel for shaft 10 while bracket 12 and journal box 14 assist in holding it rigidly in position.

Fig. 4 shows a short journal 10.

The brackets 11 act as a fulcrum for journal 10, resisting the downward pressure at 21. I believe that short shafts or journals as shown in Fig. 4 are not as rigid as the long shafts which have the additional support of bracket 12 as shown in Fig. 3.

It is observed in Fig. 3 that the journal 10 is held in position by journal boxes 13 and 14, which in turn are held in position by the brackets 11 and 12. The journal 10 has a suitable groove at one end and into which the link 15 is placed. The links 15 are supported by the bearing block 16, the latter having hollowed out places for the reception of the link 15. The bearing or saddle block 16 is located over the fulcrum or knife edge 20. The main lever 19 is supported by the main lever stand 18. The main lever is connected to another lever which does not show in the drawing. A portion of the weigh bridge or scale platform is designated by 23.

The weight of a load placed on the weigh bridge 22 is transmitted to the main lever 19 by means of the brackets, journal boxes, journals and links. The links 15 being suspended from the bearing block 16 will oscillate if there is any transverse or longitudinal thrust. In other words, it will swing after the manner of a pendulum. This action will reduce the wear and tear on the knife 20, to a minimum.

In order to disconnect the shaft or journal 10, raise the platform 22, until the weight of the weigh bridge is removed from the links 15 and the flange or collar 24 clears the link 15, remove pin 17, if there is one, remove shaft or journal 10 in the direction of bracket 12 until the link is entirely cleared.

The platform now can be raised to any desired height as it is entirely free from the scale.

The use of the pin is not entirely necessary to hold shaft in position as it can be held by clamping the journal boxes tightly on the shaft.

I claim:—

1. In a scale, the combination of a lever, a fulcrum connected thereto, holding means for a journal, a link, a saddle block by which said link is supported, said saddle block resting on said fulcrum and a shaft or journal engaged by said link.

2. In a scale, the combination of a lever, a link, a saddle block by which said link is supported, a fulcrum connected to said lever and engaged by said saddle block, holding means for the journal, and a shaft or journal engaged by said link.

3. In a scale, a lever, a saddle block, a link supported by said saddle block, a fulcrum carried by the said lever, a journal, the saddle block resting on said fulcrum and engaging said link, and tension and compression brackets coöperating with said journal, said journal engaging said link.

4. In a scale, a lever, a saddle block, a link supported by said saddle block, a fulcrum carried by the said lever, a journal, the saddle block resting on said fulcrum and engaging said link, and tension and compression brackets coöperating with said journal, said journal having a groove to engage said link.

5. In a scale, a lever, a saddle block, a link supported by said saddle block, a fulcrum carried by the said lever, a journal, the saddle block resting on said fulcrum and engaging said link, and tension and compression brackets coöperating with said journal, said journal having a groove to engage said link, said link being free to oscillate and said brackets serving as a fulcrum for said shaft.

BYRON B. GORDON.

Witnesses:
 GEO. W. WALTERS,
 ELSIE RYAN.